Patented Dec. 9, 1941

2,265,417

UNITED STATES PATENT OFFICE 2,265,417

COMPOUNDS OF THE CYCLOPENTANOPOLY-HYDROPHENANTHRENE SERIES AND PROCESS OF PREPARING THEM

Max Bockmühl, Gustav Ehrhart, and Heinrich Ruschig, Frankfort-on-the-Main-Hoechst, Germany, assignors to Winthrop Chemical Company, Inc., New York, N. Y., a corporation of New York No Drawing. Application February 26, 1941, Serial No. 380,598. In Germany January 31, 1940

4 Claims. (Cl. 260—397.1)

The present invention relates to compounds of the cyclopentanopolyhydrophenanthrene series and to a process of preparing compounds of the cyclopentanopolyhydrophenanthrene series.

U. S. patent application Serial No. 216,470 filed June 29, 1938, in the name of Max Bockmühl, Gustav Ehrhart, Heinrich Ruschig and Walter Aumüller relates to a process of preparing compounds of the cyclopentanopolyhydrophenanthrene series with a hydroxy ketone group in 17-position of the fundamental carbon skeleton which consists in treating the corresponding ketones which are free from hydroxy with an acylate of the tetravalent lead.

Now we have found that the hydroxy ketone compounds of the cyclopentanopolyhydrophenanthrene series may likewise be obtained as follows: there is started from the cyclopentanopolyhydrophenanthrene compounds having an acyl group in 17-position of the carbon skeleton, an acid organic radical, such as —CO—CH₃, —COOR, —CO—COOR or —CO—CN is introduced into the alkyl group adjacent to the side chain carbonyl, the products obtained by the reaction are subjected, if required after the transformation by saponifying agents and/or agents splitting off CO acid radical and the products obtained are subjected to a ketonic cleavage.

By condensing for instance pregnenolone with oxalic ester for instance in the presence of sodium ethylate, the corresponding oxalacetic ester compound is obtained. By subjecting the latter before or still better after the saponification to a carbon monoxide cleavage, for instance by the action of oxidizing agents, such as lead tetracylates or aryl iodosoacylates, in the presence of an alcohol, for instance ethyl-alcohol, methyl-alcohol or propylalcohol, the ester of the corresponding malonyl compound is obtained which at the methylene group now very readily takes up a free or an acylated hydroxyl by suitable oxidizing agents, such as lead tetracylates or aryl iodosoacylates. The carboxyl group situated at the hydroxymethylene group may very readily be removed by heating or by saponification and heating. In the two afore-named reactions the lead tetracylate and the aryl iodosoacylate may suitably be caused to act in about molecular proportions, in organic solvents indifferent against said agents.

The reaction occurs according to the following scheme:

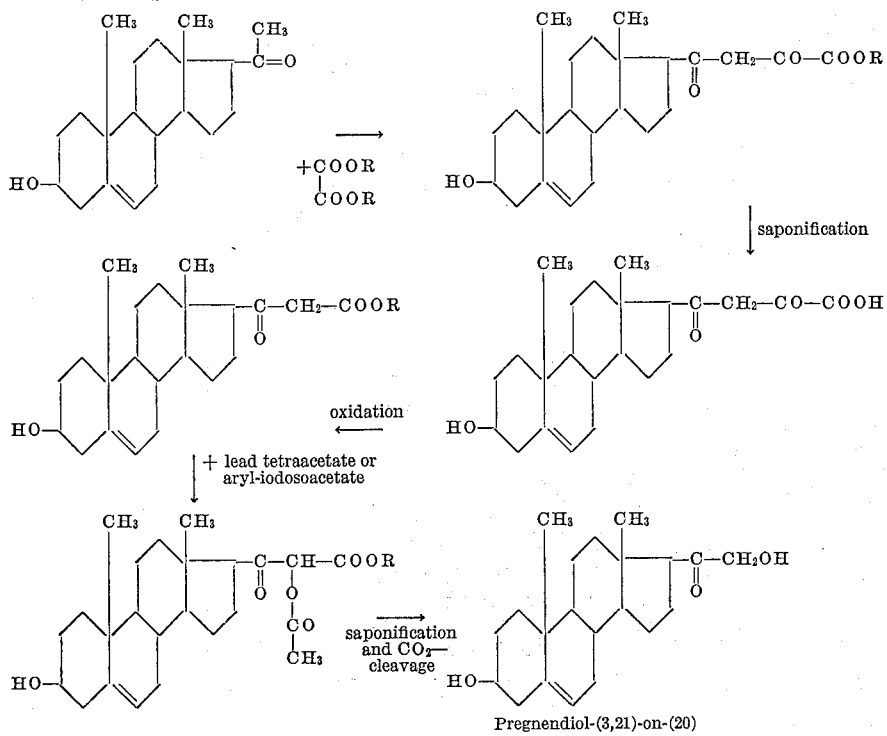

is complete, to oxidizing agents rendering possible the introduction of a free or substituted hydroxyl group into the alkyl group carrying the The ketones free from hydroxy may be condensed with the same or a similar success with ethyl acetate, chlorocarbonic acid ester, cyanocarbonic acid ester and other suitable substances allowing the introduction of an acid radical into the alkyl group, and a free or an esterified hydroxyl group may be introduced into the products obtained by the reaction and the whole may be further treated accordingly. By replacing for instance a hydrogen atom of the alkyl group adjacent to the carbonyl group by an alkali metal and condensing the alkali metal compound obtained with chlorocarbonic acid ester, the condensation product may be worked up in the manner described above.

If it is intended to transform a hydroxyl group which may stand in 3-position simultaneously into the keto group, said step of the process may be carried through in known manner, for instance with sodium butylate in the presence of acetone, directly before or after the treatment with lead tetracylates or aryl iodosoacylates.

The following example serves to illustrate the invention, but it is not intended to limit it thereto.

6.32 grams of pregnenol-(3)-on-(20) and 5.34 grams of oxalic acid diethyl ester (freshly distilled) or the corresponding quantity of dimethylester, dipropylester or dibutylester are added to a sodium alcoholate solution prepared from 0.6 gram of sodium and 65 cc. of absolute alcohol and the solution thus obtained is heated for 6 hours in a reflux apparatus. After a short time a dense precipitate already separates. After having boiled for 6 hours the solution is saponified for 45 minutes with 100 grams of ethylalcoholic potash lye of 5 per cent strength, the mixture is poured into water acidified with sulfuric acid and shaken out with ether. By the addition of a small quantity of ethyl acetate the dissolution in ether of the precipitate separated in flakes is accelerated. The acid formed is removed from the solution of ether and ethyl acetate by means of a sodium carbonate solution, the sodium salt is centrifuged, decomposed with dilute sulfuric acid and taken up again with ethyl acetate. The ethyl acetate solution is dried and evaporated and the residue is redissolved in methanol. The product melts at 225° C. with decomposition; it corresponds to the empirical formula; $C_{23}H_{32}O_5$ and has the following structural formula:

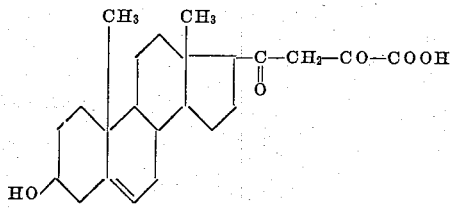

A solution of 2.94 grams of lead tetracetate in 300 cc. of benzene free from thiophen is added, drop by drop within the course of 15 minutes, while stirring, to a solution of 2.34 grams of the pregnenol-(3)-on-(20)-oxalo acid-(21) above obtained in 200 cc. of alcohol and 600 cc. of benzene free from thiophen. After stirring has been continued for 3 hours the solution is filtered and the clear solution is evaporated under reduced pressure. The residue is extracted with ether and the portions soluble in ether are extracted with petroleum ether. On concentrating the petroleum ether solution the pregnenol-(3)-on-(20)-carboxylic acid ethyl ester-(21) crystallizes. The melting point of the product is at 99° C. (uncorrected).

194 milligrams of pregnenol-(3)-on-(20)-carboxylic acid ethyl ester (21) and 245 milligrams of lead tetracetate in 30 cc. of benzene free from thiophen are kept for 6 hours at 45° C.–50° C., while stirring; the solution is then filtered, the clear solution is washed with water and after having been dried over sodium sulfate it is evaporated. The residue very strongly reduces ammoniacal silver salt solution. It is dissolved in 12.5 cc. of alcohol of 96 per cent strength and the solution is heated for 1 hour in a reflux apparatus together with 9.5 cc. of water and 0.5 cc. of concentrated sulfuric acid. The solution is poured into water, the aqueous mixture is extracted with ether and the residue of the ether is distilled under highly reduced pressure: The boiling point of the product amounts up to 210° C. under a pressure of 0.02 mm. The pregnendiol-(3.21)-on-(20) is isolated from the partly crystallized distillate.

We claim:

1. The process which comprises condensing a diester of oxalic acid with a pregnenolone, saponifying the ester thus obtained, oxidizing the free acid by means of an agent of the group consisting of lead tetraacylates and aryliodosoacylates in the presence of an alcohol, causing an agent of the group consisting of lead tetraacylates and aryl iodosoacylates to act upon the pregnenolone-carboxylic acid ester-(21) thus obtained, saponifying the reaction product and eliminating carbon dioxide from the free acid.

2. The process which comprises condensing a diester of oxalic acid with pregnenol-(3)-one-(20), saponifying the ester thus obtained, oxidizing the free acid by means of an agent of the group consisting of lead tetraacylates and aryl iodosoacylates in an organic solvent inert against said oxidizing agents and in the presence of an alcohol, causing an agent of the group consisting of lead tetraacylates and aryl iodosoacylates to act upon the pregnenol-(3)-one-(20)-carboxylic acid ester-(21) thus obtained, saponifying the reaction product and eliminating carbon dioxide from the free acid.

3. The process which comprises condensing a diester of oxalic acid with pregnenol-(3)-one-(20), saponifying the ester thus obtained, oxidizing the free acid by means of about 1 mol of an agent of the group consisting of lead tetraacylates and aryl iodosoacylates in an organic solvent inert against said oxidizing agents and in the presence of ethyl alcohol, causing about 1 mol of an agent of the group consisting of lead tetraacylates and aryliodosoacylates to act upon the pregnenol-(3)-one-(20)-carboxylic acid ester-(21) thus obtained, saponifying the reaction product and eliminating carbon dioxide from the free acid.

4. The product of the following formula:

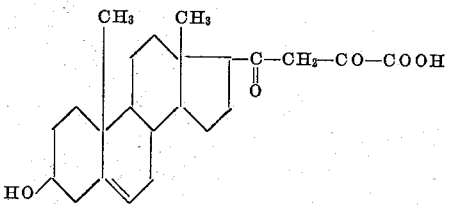

MAX BOCKMÜHL.
GUSTAV EHRHART.
HEINRICH RUSCHIG.